(12) United States Patent
Chen et al.

(10) Patent No.: US 10,013,600 B2
(45) Date of Patent: Jul. 3, 2018

(54) DIGITAL IMAGE PROCESSING METHOD AND APPARATUS, AND STORAGE MEDIUM

(71) Applicant: Xiaomi Inc., Beijing (CN)

(72) Inventors: Zhijun Chen, Beijing (CN); Tao Zhang, Beijing (CN); Pingze Wang, Beijing (CN)

(73) Assignee: Xiaomi Inc., Beijing (CN)

( * ) Notice: Subject to any disclaimer, the term of this patent is extended or adjusted under 35 U.S.C. 154(b) by 17 days.

(21) Appl. No.: 15/195,537

(22) Filed: Jun. 28, 2016

(65) Prior Publication Data
US 2017/0147869 A1 May 25, 2017

(30) Foreign Application Priority Data
Nov. 20, 2015 (CN) .......................... 2015 1 0813140

(51) Int. Cl.
  G06K 9/00 (2006.01)
  G06F 17/30 (2006.01)
  G06K 9/62 (2006.01)
  G06T 11/60 (2006.01)

(52) U.S. Cl.
  CPC ... *G06K 9/00288* (2013.01); *G06F 17/30256* (2013.01); *G06F 17/30268* (2013.01); *G06K 9/00295* (2013.01); *G06K 9/00677* (2013.01); *G06K 9/6267* (2013.01); *G06T 11/60* (2013.01); *G06K 2009/00328* (2013.01); *G06K 2209/27* (2013.01); *G06T 2207/30201* (2013.01)

(58) Field of Classification Search
  CPC .......... G06K 9/00288; G06K 9/00295; G06K 9/00677; G06K 9/6267; G06K 9/00577; G06K 2009/00328; G06K 2009/27; G06K 2009/00295; G06F 17/30256; G06F 17/30268; G06T 11/60; G06T 2207/30201
  See application file for complete search history.

(56) References Cited

U.S. PATENT DOCUMENTS

| | | | | |
|---|---|---|---|---|
| 8,855,712 | B2 * | 10/2014 | Lord | G06F 17/30244 348/222.1 |
| 8,897,504 | B2 * | 11/2014 | Steinberg | G06K 9/00208 382/118 |
| 9,280,545 | B2 * | 3/2016 | Padmanabhan | H04N 21/4126 |
| 9,400,931 | B2 * | 7/2016 | Svendsen | G06F 17/30244 |
| 9,727,312 | B1 * | 8/2017 | Svendsen | G06F 3/0481 |
| 9,779,287 | B2 * | 10/2017 | Steinberg | G06K 9/00295 |

(Continued)

FOREIGN PATENT DOCUMENTS

| CN | 101568969 A | 10/2009 |
|---|---|---|
| CN | 102202173 A | 9/2011 |

(Continued)

OTHER PUBLICATIONS

International Search Report dated Aug. 12, 2016 for International Application No. PCT/CN2015/099612, 13 pages.

(Continued)

*Primary Examiner* — Ali Bayat
(74) *Attorney, Agent, or Firm* — Brinks, Gilson & Lione

(57) ABSTRACT

The present disclosure is related to a digital image processing method and apparatus for generating a description of contents depicted in a digital image based on at least one or more of identity information of a person depicted in the digital image and digital image information.

20 Claims, 13 Drawing Sheets

(56) References Cited

U.S. PATENT DOCUMENTS

| | | |
|---|---|---|
| 2007/0065044 A1 | 3/2007 | Park et al. |
| 2010/0277615 A1 | 11/2010 | Watazawa |
| 2012/0294495 A1 | 11/2012 | Wren et al. |
| 2013/0217440 A1 | 8/2013 | Lord et al. |
| 2014/0241594 A1 | 8/2014 | Ikeda |
| 2014/0280267 A1 | 9/2014 | Perlegos |
| 2015/0074206 A1 | 3/2015 | Baldwin |
| 2015/0146040 A1 | 5/2015 | Nonaka et al. |

FOREIGN PATENT DOCUMENTS

| | | |
|---|---|---|
| CN | 102929934 A | 2/2013 |
| CN | 103259915 A | 8/2013 |
| CN | 103412951 A | 11/2013 |
| CN | 103544721 A | 1/2014 |
| CN | 103971391 A | 8/2014 |
| CN | 104317932 A | 1/2015 |
| JP | 2006-236266 A | 9/2006 |
| JP | 2007-183821 A | 7/2007 |
| JP | 2009-089046 A | 4/2009 |
| JP | 2010-218227 A | 9/2010 |
| JP | 2010-283802 A | 12/2010 |
| JP | 2015-104078 A | 6/2015 |
| JP | 2015-191392 A | 11/2015 |
| RU | 2 381 553 C1 | 2/2010 |
| WO | WO 2008/079249 A2 | 7/2008 |
| WO | WO 2013/001990 A1 | 1/2013 |
| WO | WO 2014/027675 A1 | 2/2014 |
| WO | WO 2015/107640 A1 | 7/2015 |

OTHER PUBLICATIONS

Extended European Search Report dated Aug. 21, 2017 for European Application No. 16190953.6, 12 pages.
Office Action dated Sep. 15, 2017 for Chinese Application No. 201510813140.5, 8 pages.
Office Action dated Oct. 11, 2017 for Russian Application No. 2016136709/08, 6 pages.
Office Action dated Dec. 26, 2017 for Japanese Application No. 2016-522732, 5 pages.
Office Action dated Mar. 30, 2018 for Korean Application No. 10-2016-7009865, 6 pages.

* cited by examiner

1100

DIGITAL IMAGE PROCESSING METHOD AND APPARATUS, AND STORAGE MEDIUM

CROSS REFERENCE TO RELATED APPLICATION(S)

This application claims priority to Chinese Patent Application No. 2015108131405, filed on Nov. 20, 2015, the entirety of which is hereby incorporated by reference herein.

TECHNICAL FIELD

The present disclosure relates to the technical field of image processing, and more particularly, to a digital image processing method and apparatus, and a storage medium configured to store processor executable instructions for implementing the digital image processing method.

BACKGROUND ART

Currently, as image recognition techniques develop, there have been a growing amount of research on determining the "deep meaning" expressed by images (i.e., a contextual description or explanation of the image content). However, existing automatic text generation systems for generating statements that describe content depicted by a digital image only provide simple descriptions separately for persons or objects in the digital image. Therefore, a user is not presented with information describing a relationship between persons depicted in the digital image.

SUMMARY

According to a first exemplary embodiment of the present disclosure, there is provided a digital image processing method, comprising: recognizing a face in a digital image of a user; determining a personal identity corresponding to the recognized face, the personal identity comprising at least one of an identification of a person corresponding to the face and a relationship between the person corresponding to the face and the user; acquiring digital image information of the digital image, the digital image information comprising at least one of a digital image capturing time and a digital image capturing location of the digital image; and generating a description of the digital image according to the personal identity and the digital image information.

According to a second exemplary embodiment of the present disclosure, there is provided a digital image processing apparatus, comprising: a recognizing module configured to recognize a face in a digital image of a user; a determining module configured to determine a personal identity corresponding to the face recognized by the recognizing module, the personal identity comprising at least one of an identification of a person corresponding to the face and a relationship between the person corresponding to the face and the user; an acquiring module configured to acquire digital image information of the digital image, the digital image information comprising at least one of a digital image capturing time and a digital image capturing location of the digital image; and a first generating module configured to generate a description of the digital image according to the personal identity determined by the determining module and the digital image information acquired by the acquiring module.

According to a third exemplary embodiment of the present disclosure, there is provided a digital image processing apparatus, comprising: a processor; and a memory configured to store instructions executable by the processor, wherein the processor is configured to: recognize a face in a digital image of a user; determine a personal identity corresponding to the recognized face, the personal identity comprising at least one of an identification of a person corresponding to the face and a relationship between the person corresponding to the face and the user; acquire digital image information of the digital image, the digital image information comprising at least one of a digital image capturing time and a digital image capturing location of the digital image; and generate a description of the digital image according to the personal identity and the digital image information.

According to a fourth exemplary embodiment of the present disclosure, there is provided a non-transitory computer-readable storage medium having stored therein instructions that, when executed by a processor of a mobile device, causes the mobile device to perform a digital image processing method, the method comprising: recognizing a face in a digital image of a user; determining a personal identity corresponding to the recognized face, the personal identity comprising at least one of an identification of a person corresponding to the face and a relationship between the person corresponding to the face and the user; acquiring digital image information of the digital image, the digital image information comprising at least one of a digital image capturing time and a digital image capturing location of the digital image; and generating a description of the digital image according to the personal identity and the digital image information.

It should be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise presented. The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

Embodiments of the present disclosure provide a technical solution that may be implemented, at least in part, on a computing device such as a communication device. The communication device may include well known computing systems, environments, and/or configurations suitable for implementing features of the method for knowledge base construction described herein such as, but are not limited to, digital broadcast devices, messaging devices, gaming consoles, medical devices, exercising equipment, personal digital assistants, smart phones, tablet computers, personal computers (PCs), server computers, handheld or laptop devices, multiprocessor systems, microprocessor-based systems, network PCs, server computers, minicomputers, mainframe computers, embedded systems, distributed computing environments that include any of the above systems or devices, and the like. According to the technical solution, a human face depicted in a digital image may be recognized, a personal identity of the person corresponding to the recognized human face may be determined, and a description of the contents of the digital image may be generated that accounts for the personal identity of the person.

Figure 1:
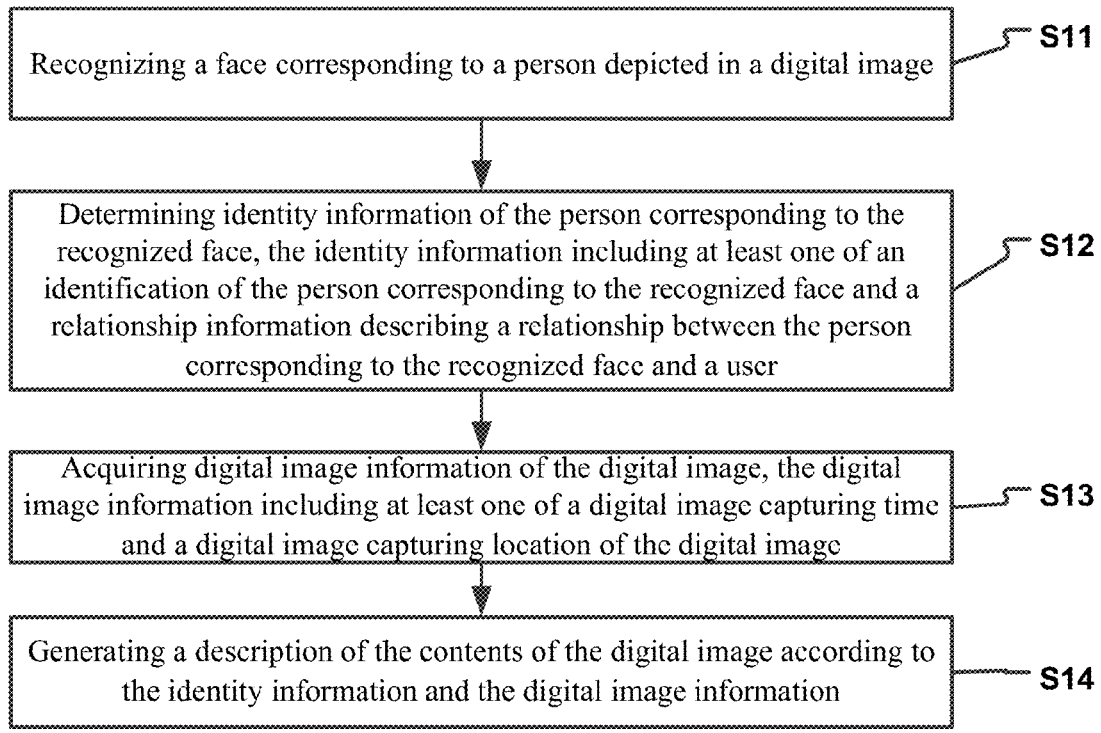
FIG. 1 is a flow chart illustrating a digital image processing method according to an exemplary embodiment.

FIG. 1 is a flow chart 100 describing a digital image processing method according to an exemplary embodiment. The digital image processing method may be implemented by a communication device.

At S11, a face corresponding to a person depicted in a digital image may be recognized.

For example, facial recognition methods based on detecting geometrical features on the face may be implemented at S11, facial recognition methods based on face templates may be implemented at S11, or facial recognition methods based on models may be employed. Among them, the template-based facial recognition methods may be classified into correlation matching-based methods, Eigenfaces methods, linear discriminant analysis methods, singular value decomposition methods, neural network methods, dynamic link matching methods and the like. For the model-based facial recognition methods include those based on Hidden Markov Model, Active Shape Model and Active Appearance Model.

At S12, identity information of the person corresponding to the recognized face is determined. The identity information includes at least one of an identification of the person corresponding to the recognized face and a relationship information describing a relationship between the person corresponding to the recognized face and a user. The user may be a predetermined person identified by the communication device running the digital image processing method as the user. The user may, for example, be understood to be the owner of the communication device.

The identification information identifying the person corresponding to the recognized face depicted in the digital image may identity the person according to the person's name, a network account corresponding to the person, a nickname corresponding to the person, or a code name corresponding to the person. The relationship information may describe a relationship between the person and the user such as, for example, a family relationship, a kinship, a schoolmate relationship, a colleague relationship, a friend relationship, or the like.

At S13, digital image information of the digital image is acquired. The digital image information may include at least one of a digital image capturing time and a digital image capturing location of the digital image.

The digital image information of the digital image may be extracted from an exchangeable image file (abbreviated as exif) corresponding to the digital image. The exif may include metadata that is assigned to digital images captured by a digital camera, where the metadata includes at least one or more of the following types of information upon capturing the digital image: a digital image capturing time, digital image capturing equipment (e.g., main body of the equipment, lens, flashlight, etc.), digital image capturing parameters (e.g., shutter speed, aperture F-number, ISO speed, focal length, metering mode, etc.), image processing parameters (e.g., sharpness, contrast, saturation, white balance, etc.), image description and copyright information, a digital image capturing location (e.g., GPS positioning data, etc.), and a thumbnail of the digital image.

At S14, a description of the digital image may be generated according to the identity information and the digital image information. For instance, identity information of faces depicted in the digital image may be obtained by image recognition techniques that recognize face(s) depicted in the digital image. Then based on the obtained identity information, it may be determined that the person corresponding to the recognized faces depicted in the digital image are those of the user's parents. The digital image information may describe attributes of the digital image itself such as a time/date when the digital image was captured and a location where the image was captured. For example, the acquired digital image information of the digital image may include a digital image capturing time of Oct. 1, 2015 and a digital image capturing location of Tiananmen in China.

Then, by analyzing the digital image and obtaining the identity information and/or the digital image information, the following information may be obtained: "parents" for relationship information, "Oct. 1, 2015" for digital image capturing information, and "Tiananmen, China" for digital image capturing location information. Then, a description of the digital image (e.g., "with parents at Tiananmen on Oct. 1, 2015", "have a trip in Beijing with parents on Oct. 1, 2015", etc.) may be generated by using an abstract generation technology among natural language processing technologies (e.g., Extractive algorithm or Abstractive algorithm).

In this embodiment, the face(s) depicted in the digital image maybe recognized and the description of the digital image may be generated according to the identify information of the person corresponding to the recognized face(s), as well as the digital image information of the digital image, so that the description of the digital image may be generated more accurately. The intelligence for automatically generating a description of a digital image is improved to be closer to a human's ability to describe the digital image, and thus the user may quickly obtain an accurate description of every digital image, and the user experience is improved.

In another embodiment, the identity information for the person corresponding to the recognized face may be determined according to one of the following implementations.

I. According to a first implementation, identity information of the person corresponding to the face depicted in a digital image may be determined according to a preset personal information database.

Figure 2:
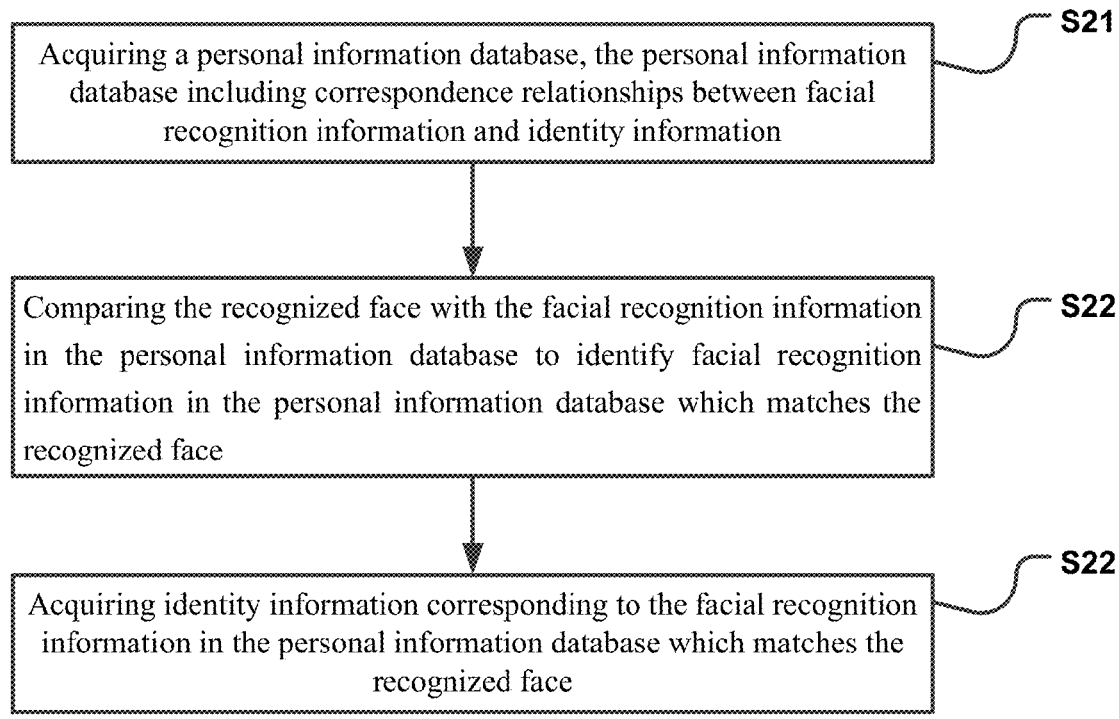
FIG. 2 is a flow chart illustrating a digital image processing method according to another exemplary embodiment.

FIG. 2 is a flow chart 200 describing a digital image processing method for determining identity information of a person corresponding to a face depicted in a digital image according to a preset personal information database according to another exemplary embodiment. The digital image processing method may be implemented by a communication device.

At S21, a personal information database may be acquired from a data storage device, where the personal information database includes correspondence relationships that match up facial recognition information with corresponding identity information. The personal information database may be predetermined and stored on the data storage device prior to the implementation of the digital image processing method described by flow chart 200. For example, the personal information database may be in a prepopulated table data format.

At S22, the recognized face may be compared with the facial recognition information in the personal information database to identify facial recognition information in the personal information database which matches the recognized face.

At S23, identity information corresponding to the facial recognition identified in the personal information database as matching the recognized face is acquired.

The user may pre-store the information included in the personal information database in advance. For example, the personal information database may be generated by inputting face photos of family members into the personal information database and setting identity information for the face photos that identify the family member's identity. The personal information database may also be generated by assigning a family relationship type of relationship information corresponding to a face photo or identity information already stored in the personal information database. This may be done for every family member identified for the user. Additionally or alternatively, schoolmates, friends, colleagues or other relationship information may be added to the personal information database.

II. According to a second implementation, identity information of the person corresponding to the face depicted in a digital image may be determined according to contact information of the user.

Figure 3:
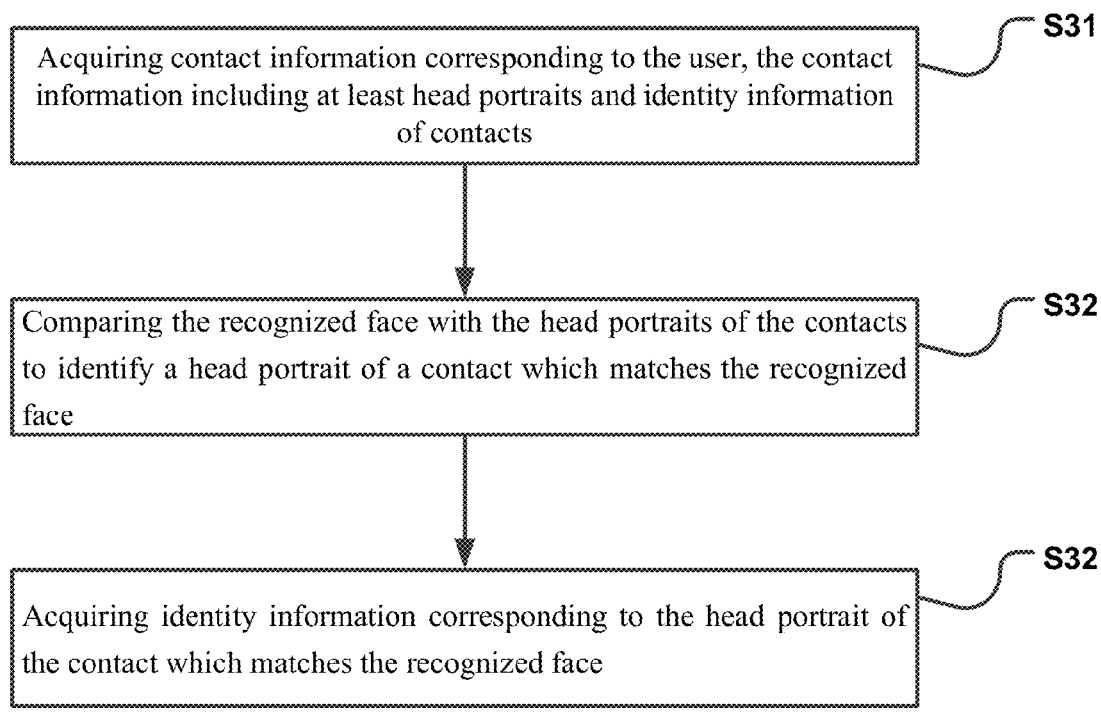
FIG. 3 is a flow chart illustrating a digital image processing method according to another exemplary embodiment.

FIG. 3 is a flow chart 300 illustrating a digital image processing method for determining identity information of the person corresponding to the face depicted in a digital image according to contact information of the user according to another exemplary embodiment. The digital image processing method may be implemented by a communication device.

At S31, contact information corresponding to the user may be acquired. The contact information may be a contact list stored on a memory of the communication device implementing the digital image processing method. The contact information may include head portrait digital images that include a person's face and identity information of contacts known by the user (e.g., people whose contact information is included in the contact list).

At S32, the recognized face may be compared with the head portrait digital images included in the contact information to identify a head portrait digital image which matches the recognized face. In particular, people's faces depicted in the head portrait digital image may be parsed and analyzed to identify a head portrait that includes a person's face that matches the recognized face.

At S33, identity information corresponding to the head portrait digital image that includes the people's face that matches the recognized face is acquired.

Thus, the identity information of the person corresponding to the recognized face in the digital image may be determined according to the head portraits in the contact list.

In this embodiment, these two implementations for determining the identity information may be utilized alone or in combined together, which is to say, the identity information may be determined according to one, or both the personal information database and the contact information in the contact list.

In this embodiment, by determining the identity information for the person corresponding to the recognized face according to either of the above-described implementations or a combination thereof, the identity information for the person who's face is depicted in the digital image may be determined precisely, so that a more accurate description of the digital image may be generated subsequently according to the determined identity information, the intelligence for automatic description of a digital image is improved to be closer to a human's ability to describe the digital image, and the user can quickly obtain an accurate description of a digital image, and user experience is improved.

In another embodiment, to generate the description of the digital image more accurately, other information of the digital image (e.g., digital image information, information of an object other than faces in the digital image, or the like) may be further acquired.

Figure 4:
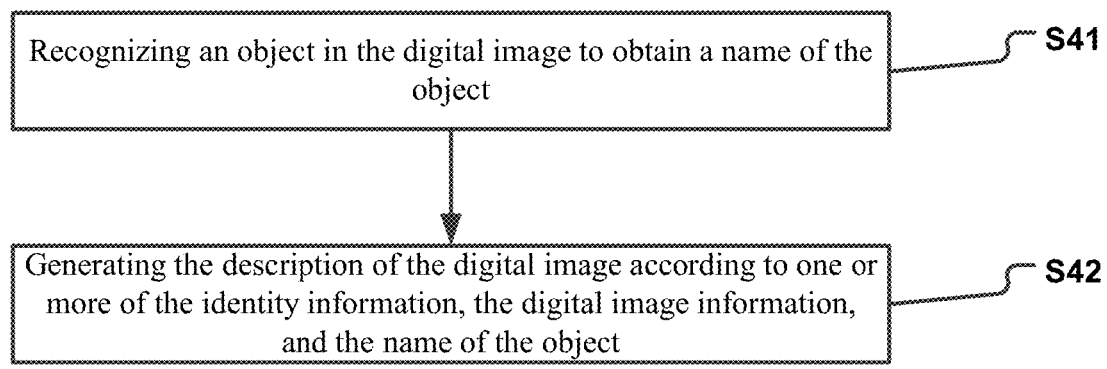
FIG. 4 is a flow chart illustrating a digital image processing method according to another exemplary embodiment.

FIG. 4 is a flow chart 400 describing a digital image processing method according to another exemplary embodiment. As shown in FIG. 4, generating the description of the digital image may further comprise the following steps in addition to the steps described by flow chart 100. The digital image processing method may be implemented by a communication device At S41, an object depicted in the digital image may be recognized, and a name identifying the recognized object may be obtained.

Image recognition algorithms such as region based convolutional neural network (R-CNN) and fast convolutional neural network (fast-CNN) may be utilized to recognize object(s) contained in a digital image. For example, possible candidate areas are first framed in the digital image, and then CNN classification is performed for objects in the framed areas.

At S42, the description of the digital image may be generated according to one or more of the identity information, the digital image information, and the name of the object.

For example, when the digital image capturing time of the digital image is determined to be Oct. 1, 2015, the digital image capturing location of the digital image is determined to be Tiananmen Square, the relationship information identifies the faces in the digital image to be those of the user's parents, and the names of the recognized objects in the digital image identify the objects as flowers, a national flag and the like, then the generated description may be "see a flag-raising ceremony with parents at Tiananmen Square on Oct. 1, 2015".

Furthermore, in addition to the identity information, the digital image information and the name of the object, other information may also be taken into consideration to automatically generate the description of the digital image (e.g., weather information for the day on which the digital image is taken, a news event occurring at the digital image capturing time and location, or the like.)

In this embodiment, the description may be generated according to various types of information related to the digital image, so that the description becomes more accurate, the intelligence for automatic description of a digital image is improved to be closer to human's ability to describe the digital image, the user can quickly get an accurate knowledge of every digital image, and user experience is improved.

Figure 5:
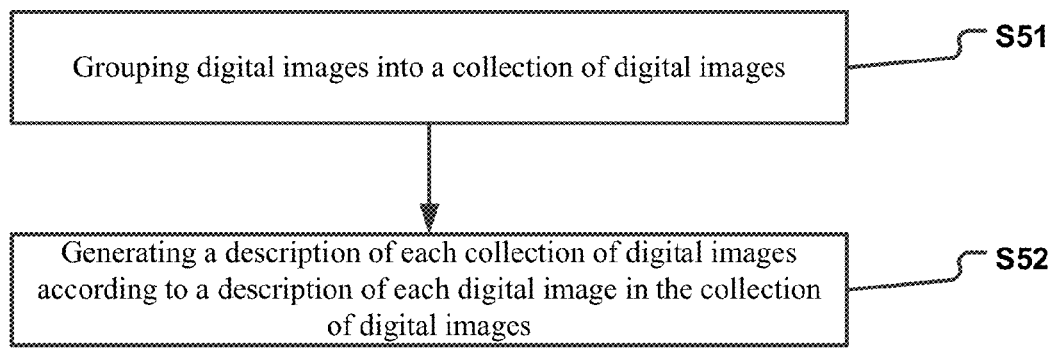
FIG. 5 is a flow chart illustrating a digital image processing method according to another exemplary embodiment.

In another embodiment, digital images may be grouped into a collection of digital images, and an overall description may be generated for each collection of digital images. FIG. 5 is a flow chart 500 illustrating a digital image processing method according to this exemplary embodiment.

At S51, digital images may be grouped into a collection of digital images. The digital images that are grouped may correspond to the user in some way. For example, each digital image may include a depiction of the user among other digital image content.

In step S52, a description of each collection of digital images may be generated according to a description of each digital image in the collection of digital images.

For example, representative text fragments may be extracted from descriptions corresponding to individual digital images in each collection of digital images by employing the Extractive algorithm. The representative text fragments may then be integrated to generate the description of each collection of digital images.

The digital images may be grouped according to digital image capturing scenes. Grouping the digital images into a collection of digital images may include grouping the digital images according to at least one of the following factors: digital image capturing times and digital image capturing locations of the digital images and faces in the digital images.

For example, the user may group the photos taken on Oct. 1, 2015 into one collection of digital images, group the digital images taken at Tiananmen Square into another collection of digital images, all the digital images containing the faces of the user's parents into another collection of digital images, the digital images taken at Tiananmen Square on Oct. 1, 2015 into another collection of digital images, the digital images containing the faces of the user's parents and taken on Oct. 1, 2015 into another collection of digital images, the digital images containing the faces of the user's parents and taken at Tiananmen Square into another collection of digital images, or the digital images containing the faces of the user's parents and taken at Tiananmen Square on Oct. 1, 2015 into another collection of digital images.

Digital images taken in the same scene may be assigned to different collections of digital images by grouping these photos based on information such as digital image information of the digital images and faces in the digital images, thereby facilitating subsequent accurate automatic description of each collection of digital images.

The user may access and browse the digital images according to collections of digital images, where the grouping and the description of each collections of digital images may be displayed upon reception of a browsing command input by the user to the communication device with control over access to the collections of digital images. In addition, the digital images in each collection of digital images and the descriptions of the digital images may be displayed in a slideshow manner.

In this embodiment, the digital images may be described according to the collection of digital images to which they are assigned to, and the grouped digital images and the description thereof may be displayed, so that the user can quickly get an accurate knowledge of each group of digital images and user experience is improved.

In the following, embodiments of the apparatus of the present disclosure, which may be applied to implement the embodiments of the method of the present disclosure, are described.

Figure 6:
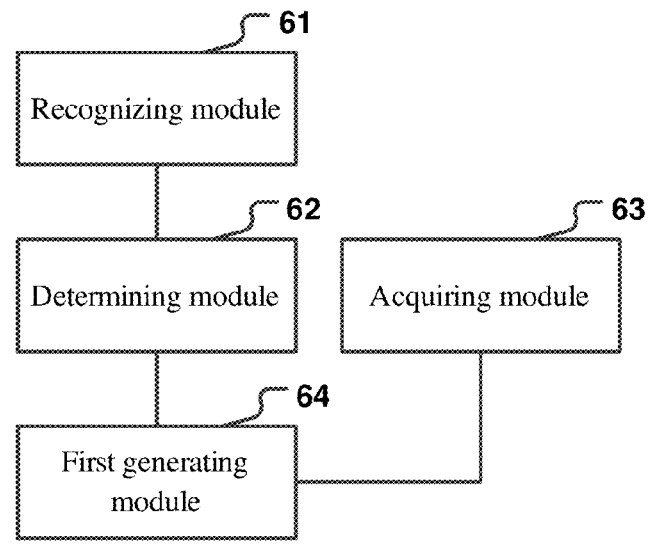
FIG. 6 is a block diagram illustrating a digital image processing apparatus according to an exemplary embodiment.

FIG. 6 is a block diagram illustrating a digital image processing apparatus 600 according to an exemplary embodiment. The digital image processing apparatus 600 may be implemented as part of or whole of an electronic device through software, hardware, circuitry, or a combinations thereof. As shown in FIG. 6, the digital image processing apparatus may include: a recognizing module 61 configured to recognize a face in a digital image.

For example, geometrical feature-based facial recognition methods, template-based facial recognition methods, and/or model-based facial recognition methods may be employed or implemented by the recognizing module 61. Among them, the template-based facial recognition methods may be classified into correlation matching-based methods, Eigenfaces methods, linear discriminant analysis methods, singular value decomposition methods, neural network methods, dynamic link matching methods and the like. And the model-based facial recognition methods include those based on Hidden Markov Model, Active Shape Model and Active Appearance Model.

A determining module 62 may be configured to determine identity information for a person corresponding to the face recognized by the recognizing module 61, the identity information comprising at least one of an identification of the person corresponding to the face and a relationship between the person corresponding to the face and the user.

The identification information identifying the person corresponding to the recognized face depicted in the digital image may identity the person according to the person's name, a network account corresponding to the person, a nickname corresponding to the person, or a code name corresponding to the person. The relationship information may describe a relationship between the person and the user such as, for example, a family relationship, a kinship, a schoolmate relationship, a colleague relationship, a friend relationship, or the like.

An acquiring module 63 may be configured to acquire digital image information of the digital image, the digital image information comprising at least one of a digital image capturing time and a digital image capturing location of the digital image.

The digital image information of the digital image may be extracted from an exchangeable image file (abbreviated as exif) corresponding to the digital image. The exif may include metadata that is assigned to digital images captured by a digital camera, where the metadata includes at least one or more of the following types of information upon capturing the digital image: a digital image capturing time, digital image capturing equipment (e.g., main body of the equipment, lens, flashlight, etc.), digital image capturing parameters (e.g., shutter speed, aperture F-number, ISO speed, focal length, metering mode, etc.), image processing parameters (e.g., sharpness, contrast, saturation, white balance, etc.), image description and copyright information, a digital image capturing location (e.g., GPS positioning data, etc.), and a thumbnail of the digital image.

A first generating module 64 may be configured to generate a description of the digital image according to the identity information determined by the determining module 62 and the digital image information acquired by the acquiring module 63.

For instance, the face(s) in the digital image may be recognized by the recognizing module 61, the determining module 62 determines that the faces in the digital image are those of the user's parents, and the digital image information of the digital image acquired by the acquiring module 63 includes a digital image capturing time of Oct. 1, 2015 and a digital image capturing location of Tiananmen. Then the first generating module 64 may use an abstract generation technology among natural language processing technologies to generate a description of the digital image as follows: "with parents at Tiananmen on Oct. 1, 2015", "have a trip in Beijing with parents on Oct. 1, 2015".

In this embodiment, the face(s) in the digital image may be recognized by the recognizing module 61, and the first generating module 64 generates the description of the digital image according to the identity information corresponding to the face(s) determined by the determining module 62 as well as the digital image information of the digital image acquired by the acquiring module 63, so that a description of the digital image may be generated more accurately, the intelligence for automatic description of a digital image is improved to be closer to human's ability to describe the digital image, the user can quickly get an accurate knowledge of every digital image, and user experience is improved.

In another embodiment, the identity information for the person corresponding to the recognized face may be determined according to one of the following implementations.

I. According to a first implementation, identity information of the person corresponding to the face depicted in a digital image may be determined according to a preset personal information database.

Figure 7:
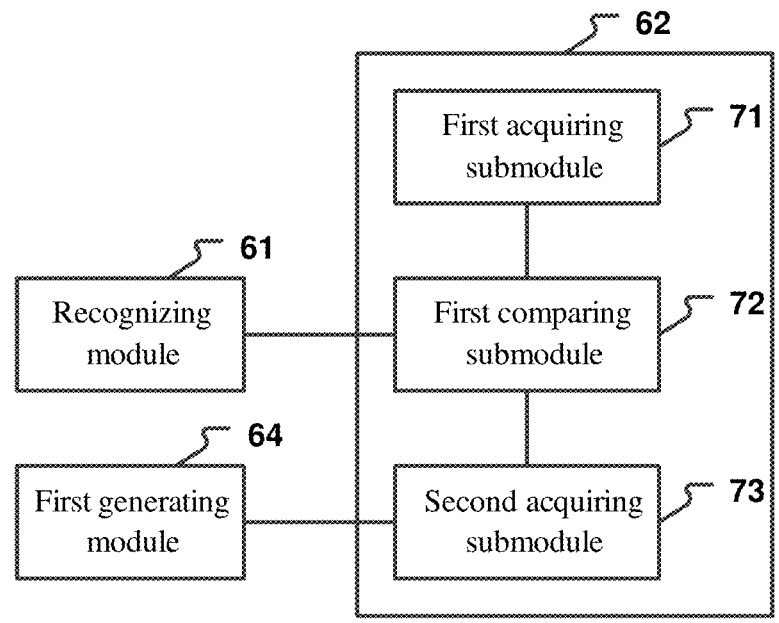
FIG. 7 is a block diagram illustrating a determining module according to an exemplary embodiment.

FIG. 7 is a block diagram illustrating the determining module 62 according to an exemplary embodiment. As shown in FIG. 7, the determining module 62 includes: a first acquiring submodule 71 configured to acquire a personal information database, the personal information database including correspondence relationships that match up facial recognition information with corresponding identity information. The personal information database may be predetermined and stored on the data storage device prior to the implementation of the digital image processing method described by flow chart 200. For example, the personal information database may be in a prepopulated table data format. The determining module may further include a first comparing submodule 72 configured to compare the face recognized by the recognizing module 61 with facial recognition information stored in the personal information database acquired by the first acquiring submodule 71 to find facial recognition information in the personal information database which matches the recognized face. The determining module may further include a second acquiring submodule 73 configured to acquire identity information corresponding to the facial recognition information in the personal information database which matches the recognized face.

The user may pre-store the information included in the personal information database in advance. For example, the personal information database may be generated by inputting face photos of family members into the personal information database and setting identity information for the face photos that identify the family member's identity. The personal information database may also be generated by assigning a family relationship type of relationship information corresponding to a face photo or identity information already stored in the personal information database. This may be done for every family member identified for the user. Additionally or alternatively, schoolmates, friends, colleagues or other relationship information may be added to the personal information database.

II. According to a second implementation, identity information of the person corresponding to the face depicted in a digital image may be determined according to contact information of the user.

Figure 8:
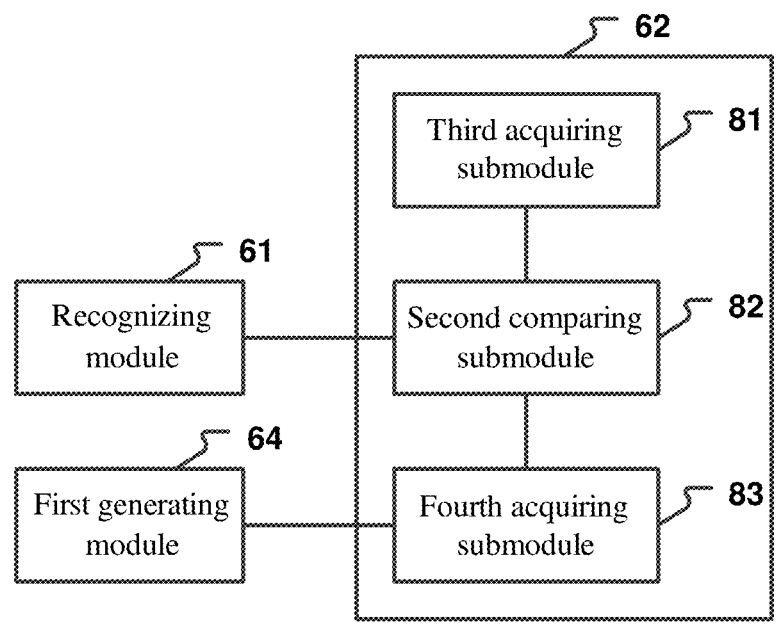
FIG. 8 is a block diagram illustrating a determining module according to another exemplary embodiment.
Figure 10:
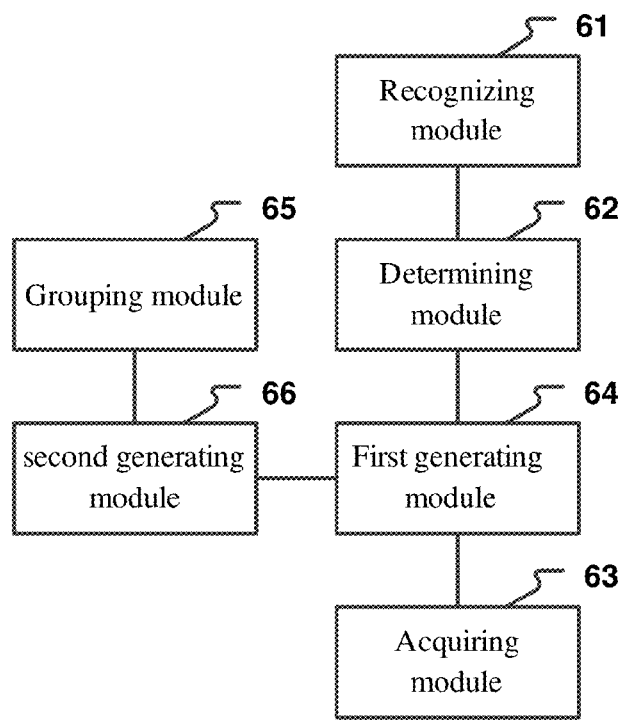
FIG. 10 is a block diagram illustrating a digital image processing apparatus according to another exemplary embodiment.

FIG. 8 is a block diagram illustrating the determining module 62 according to another exemplary embodiment. As shown in FIG. 10, the determining module 62 may include: a third acquiring submodule 81 configured to acquire contact information corresponding to the user, the contact information may include head portrait digital images that include a person's face and identity information of contacts known by the user (e.g., people whose contact information is included in the contact list). The determining module 62 may further include a second comparing submodule 82 configured to compare the face recognized by the recognizing module 61 with the head portrait digital images to identify a head portrait digital image that includes a person's face that matches the recognized face. The determining module 62 may further include a fourth acquiring submodule 83 configured to acquire identity information of a person corresponding to the head portrait digital image determined to include the person's face that matches the recognized face.

Thus, the identity information of the person corresponding to the face in the digital image may be determined by virtue of the head portrait digital images.

In this embodiment, these two implementations for determining the identity information may be utilized alone or in combined together, which is to say, the identity information may be determined according to one, or both the personal information database and the contact information in the contact list.

In this embodiment, by determining the identity information for the person corresponding to the recognized face according to either of the above-described implementations or a combination thereof, the identity information for the person who's face is depicted in the digital image may be determined precisely, so that a more accurate description of the digital image may be generated subsequently according to the determined identity information, the intelligence for automatic description of a digital image is improved to be closer to a human's ability to describe the digital image, and the user can quickly obtain an accurate description of a digital image, and user experience is improved.

In another embodiment, to generate the description of the digital image more accurately, other information of the digital image (e.g., digital image information, information of an object other than faces in the digital image, or the like) may be further acquired.

Figure 9:
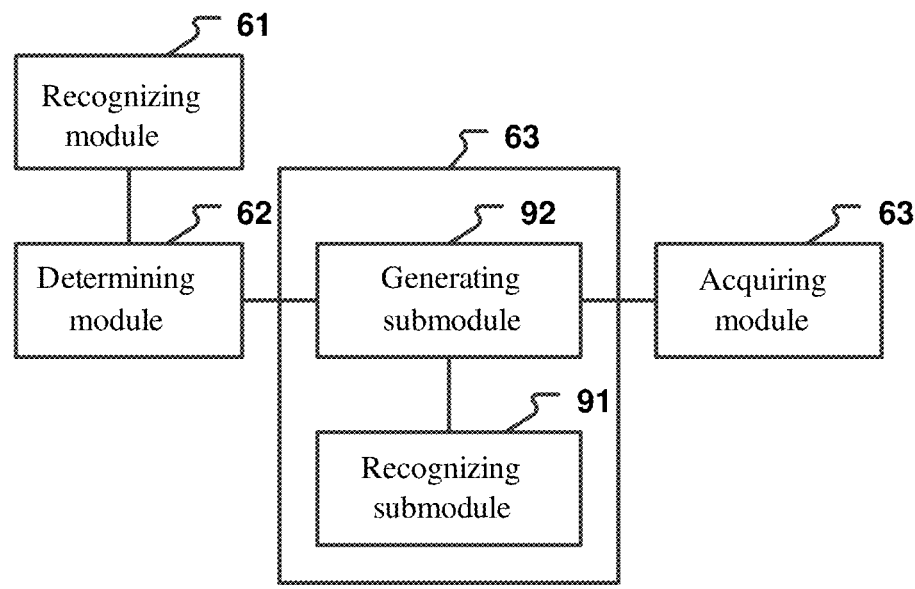
FIG. 9 is a block diagram illustrating a first generating module according to an exemplary embodiment.

FIG. 9 is a block diagram illustrating the first generating module 64 according to an exemplary embodiment. As shown in FIG. 9, optionally, the first generating module 64 may include: a recognizing submodule 91 configured to recognize an object in the digital image to obtain a name of the object. Algorithms such as R-CNN and fast-CNN may be utilized to recognize object(s) included in a digital image. For example, possible candidate areas are first framed in the digital image, and then CNN classification is performed for objects in these framed areas.

A generating submodule 92 may be configured to generate the description of the digital image according to the identity information determined by the determining module 62, the digital image information acquired by the acquiring module 63, and the name of the object recognized by the recognizing submodule 91.

For example, when the digital image capturing time of the digital image is determined to be Oct. 1, 2015, the digital image capturing location of the digital image is determined to be Tiananmen Square, the relationship information identifies the faces in the digital image to be those of the user's parents, and the names of the recognized objects in the digital image identify the objects as flowers, a national flag and the like, then the generated description may be "see a flag-raising ceremony with parents at Tiananmen Square on Oct. 1, 2015".

Furthermore, in addition to the identity information, the digital image information and the name of the object, other information may also be taken into consideration to automatically generate the description of the digital image (e.g., weather information for the day on which the digital image is taken, a news event occurring at the digital image capturing time and location, or the like.).

In this embodiment, the description may be generated according to various types of information related to the digital image, so that the description becomes more accurate, the intelligence for automatic description of a digital image is improved to be closer to human's ability to describe the digital image, the user can quickly get an accurate knowledge of every digital image, and user experience is improved.

In another embodiment, digital images may also be grouped into a collection of digital images, and an overall description may be generated for each collection of digital images. FIG. 10 is a block diagram illustrating a digital image processing apparatus 1000 according to another exemplary embodiment. As shown in FIG. 10, the digital image processing apparatus 1000 includes: a grouping module 65 configured to group digital images into a collection of digital images. The digital images that are grouped may correspond to the user in some way. For example, each digital image may include a depiction of the user among other digital image content The digital image processing apparatus 1000 may further include a second generating module 66 configured to generate a description of each collection of digital images according to a description of each digital image in the collection of digital images generated by the first generating module 63.

In another embodiment, the grouping module 65 may be configured to group the digital images according to at least one of the following factors: digital image capturing times and digital image capturing locations of the digital images acquired by the acquiring module 63 and faces in the digital images recognized by the recognizing module 61.

For example, the user may group the photos taken on Oct. 1, 2015 into one collection of digital images, group the digital images taken at Tiananmen Square into another collection of digital images, all the digital images containing the faces of the user's parents into another collection of digital images, the digital images taken at Tiananmen Square on Oct. 1, 2015 into another collection of digital images, the digital images containing the faces of the user's parents and taken on Oct. 1, 2015 into another collection of digital images, the digital images containing the faces of the user's parents and taken at Tiananmen Square into another collection of digital images, or the digital images containing the faces of the user's parents and taken at Tiananmen Square on Oct. 1, 2015 into another collection of digital images.

Digital images taken in the same scene may be assigned to different collections of digital images by grouping these photos based on information such as digital image information of the digital images and faces in the digital images, thereby facilitating subsequent accurate automatic description of each collection of digital images.

Figure 11:
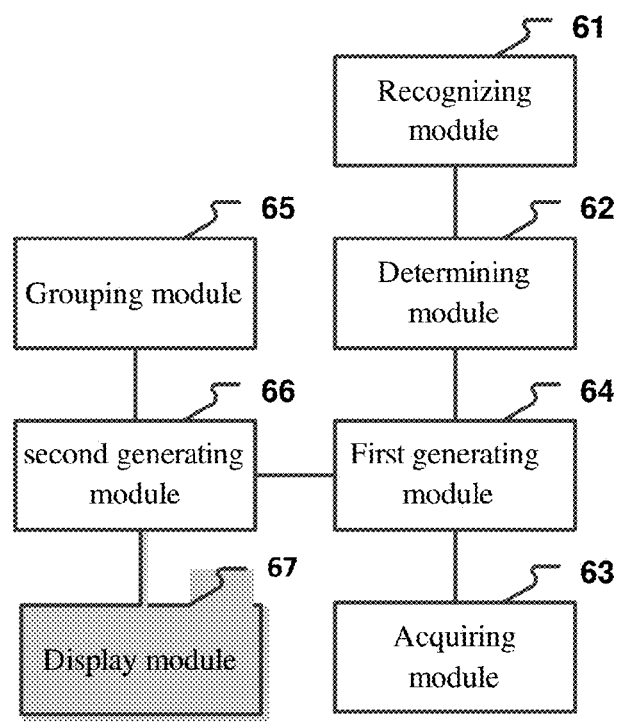
FIG. 11 is a block diagram illustrating a digital image processing apparatus according to another exemplary embodiment.

FIG. 11 is a block diagram illustrating a digital image processing apparatus 1100 according to another exemplary embodiment. As shown in FIG. 11, the digital image processing apparatus 1100 may include: a display module 67 configured to display the collections of digital images and the description of each collection of digital images generated by the second generating module 66 upon reception of a browsing command input by the user into the digital image processing apparatus 1100.

Optionally, the display module 67 may be configured to display the digital images in each collection of digital images and the descriptions of the digital images generated by the first generating module 64 in a slideshow manner.

The user may browse the digital images by collections of digital images, where the collections of digital images and the description of each collection of digital images are displayed upon reception of a browsing command input by the user. In addition, the digital images in each collection of digital images and the descriptions of the digital images may be displayed in a slideshow manner.

In this embodiment, the digital images may be described by collection of digital images and the collections of digital images and the description thereof are displayed, so that the user can quickly get an accurate knowledge of each group of digital images and user experience is improved.

The present disclosure also provides a digital image processing apparatus, comprising: a processor; a memory configured to store processor executable instructions, wherein the processor is configured to execute the instructions to: recognize a face in a digital image corresponding to a user; determine identity information of a person corresponding to the recognized face, the identity information comprising at least one of an identification of the person corresponding to the recognized face and a relationship between the person corresponding to the recognized face and the user; acquire digital image information of the digital image, the digital image information comprising at least one of a digital image capturing time and a digital image capturing location of the digital image; and generate a description of the digital image according to the identity information and the digital image information.

Figure 12:
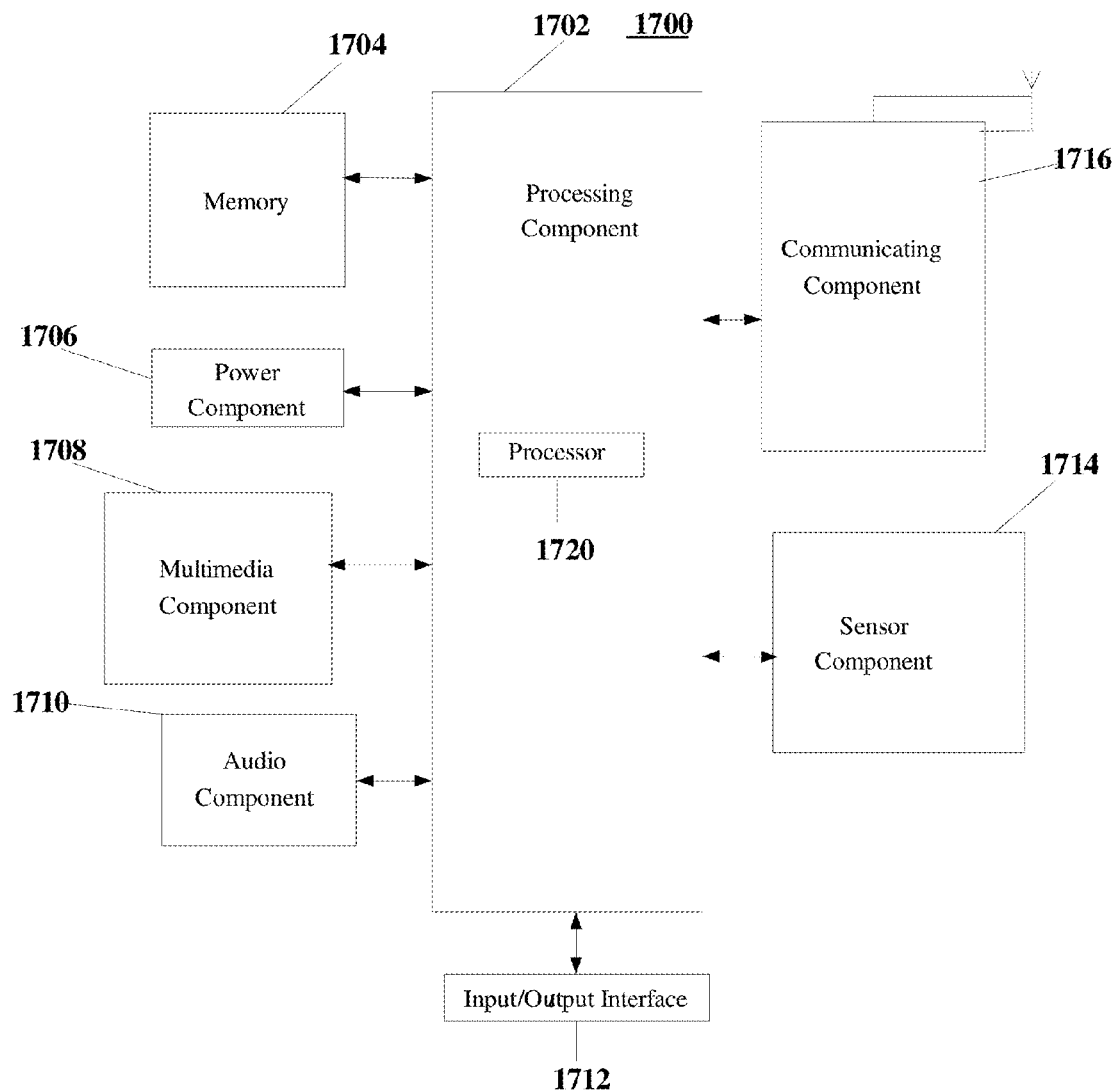
FIG. 12 is a block diagram illustrating an apparatus for processing a digital image according to an exemplary embodiment.

FIG. 12 is a block diagram of an apparatus 1700 for processing digital image according to an exemplary embodiment, which is applicable to a device. For example, the apparatus 1700 may be a camera, a sound recording device, a mobile phone, a computer, a digital broadcast device, a messaging device, a gaming console, a tablet, a medical device, exercise equipment, a personal digital assistant or the like.

Referring to FIG. 12, the apparatus 1700 may include one or more of the following components: a processing component 1702, a memory 1704, a power component 1706, a multimedia component 1708, an audio component 1710, an input/output (I/O) interface 1712, a sensor component 1714, and a communication component 1716.

The processing component 1702 typically controls overall operations of the apparatus 1700, such as the operations associated with display, telephone calls, data communications, camera operations, and recording operations. The processing component 1702 may include one or more processors 1720 to execute instructions to perform all or part of the steps in the above described methods. Moreover, the processing component 1702 may include one or more modules which facilitate the interaction between the processing component 1702 and other components. For instance, the processing component 1702 may include a multimedia module to facilitate the interaction between the multimedia component 1708 and the processing component 1702.

The memory 1704 is configured to store various types of data to support the operation of the apparatus 1700. Examples of such data include instructions for any applications or methods operated on the apparatus 1700, contact data, phonebook data, messages, digital images, video, etc. The memory 1704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1706 provides power to various components of the apparatus 1700. The power component 1706 may include a power management system, one or more power sources, and any other components associated with the generation, management, and distribution of power in the apparatus 1700.

The multimedia component 1708 includes a screen providing an output interface between the apparatus 1700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1708 includes a front camera and/or a rear camera. The front camera and the rear camera may receive an external multimedia datum while the apparatus 1700 is in an operation mode, such as a digital image capturing mode or a video mode. Each of the front camera and the rear camera may be a fixed optical lens system or have focus and optical zoom capability.

The audio component 1710 is configured to output and/or input audio signals. For example, the audio component 1710 includes a microphone ("MIC") configured to receive an external audio signal when the apparatus 1700 is in an operation mode, such as a call mode, a recording mode, and a voice recognition mode. The received audio signal may be further stored in the memory 1704 or transmitted via the communication component 1716. In some embodiments, the audio component 1710 further includes a speaker to output audio signals.

The I/O interface 1712 provides an interface between the processing component 1702 and peripheral interface modules, such as a keyboard, a click wheel, buttons, and the like. The buttons may include, but are not limited to, a home button, a volume button, a starting button, and a locking button.

The sensor component 1714 includes one or more sensors to provide status assessments of various aspects of the apparatus 1700. For instance, the sensor component 1714 may detect an open/closed status of the apparatus 1700, relative positioning of components, e.g., the display and the keypad, of the apparatus 1700, a change in position of the apparatus 1700 or a component of the apparatus 1700, a presence or absence of user contact with the apparatus 1700, an orientation or an acceleration/deceleration of the apparatus 1700, and a change in temperature of the apparatus 1700. The sensor component 1714 may include a proximity sensor configured to detect the presence of nearby objects without any physical contact. The sensor component 1714 may also include a light sensor, such as a CMOS or CCD image sensor, for use in imaging applications. In some embodiments, the sensor component 1714 may also include an accelerometer sensor, a gyroscope sensor, a magnetic sensor, a pressure sensor, or a temperature sensor.

The communication component 1716 is configured to facilitate communication, wired or wirelessly, between the apparatus 1700 and other devices. The apparatus 1700 can access a wireless network based on a communication standard, such as Wi-Fi, 2G, or 3G, or a combination thereof. In one exemplary embodiment, the communication component 1716 receives a broadcast signal or broadcast associated information from an external broadcast management system via a broadcast channel. In one exemplary embodiment, the communication component 1716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 1700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 1704, executable by the processor 1720 in the apparatus 1700, for performing the above-described methods. For example, the non-transitory computer-readable storage medium may be a ROM, a RAM, a CD-ROM, a magnetic tape, a floppy disc, an optical data storage device, and the like.

Figure 13:
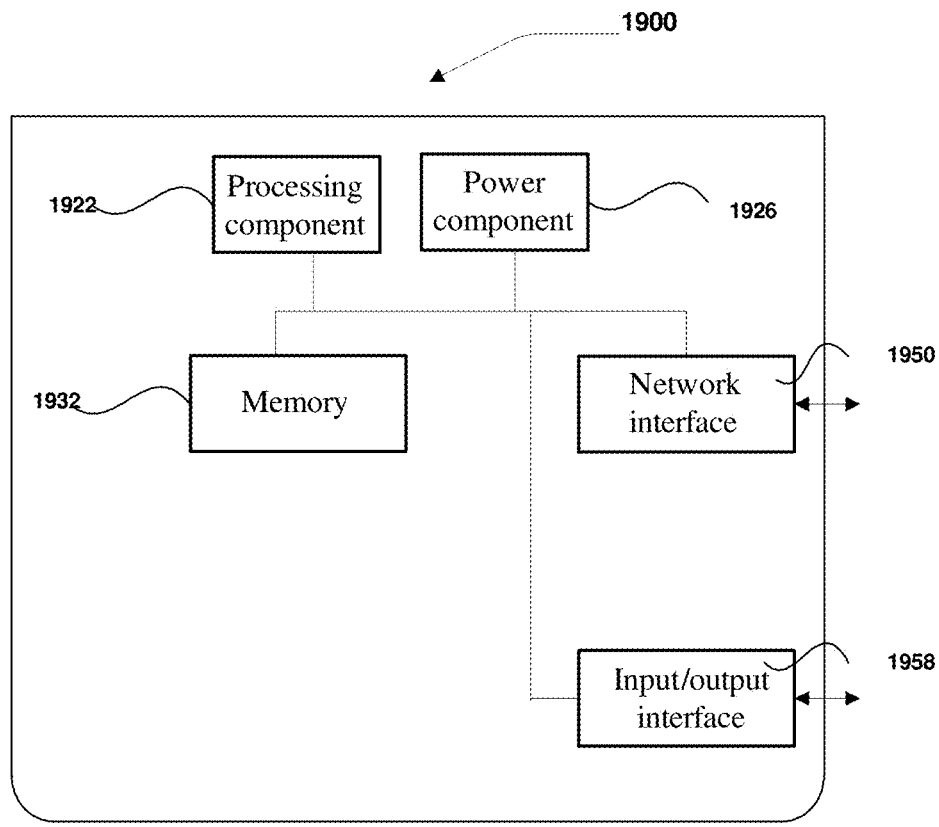
FIG. 13 is a block diagram illustrating an apparatus for processing a digital image according to an exemplary embodiment.

FIG. 13 is a block diagram illustrating an apparatus for processing a digital image according to an exemplary embodiment. For example, the apparatus 1900 may be provided as a server. The apparatus 1900 comprises a processing component 1922, which further comprises one or more processors, and a memory resource represented by a memory 1932, which is configured to store instructions (e.g. application programs) that are executable by the processing component 1922. The application programs stored in the memory 1932 may comprise one or more modules, each of which corresponds to a group of instructions. In addition, the processing component 1922 is configured to execute the instructions, in order to implement the methods described above.

The apparatus 1900 may also comprise a power component 1926 configured to perform power management for the apparatus 1900, a wired or wireless network interface 1950 configured to connect the apparatus 1900 to a network, and an input/output (I/O) interface 1958. The apparatus 1900 may operate based on an operating system (e.g., Windows Server™, Mac OS X™, Unix™, Linux™, FreeBSD™ or the like) stored in the memory 1932.

There is also provided a non-transitory computer-readable storage medium including instructions, which when executed by the processor of the apparatus 1700 or 1900 cause the apparatus 1700 or 1900 to perform the above-described digital image processing method. The method comprises: recognizing a face in a digital image corresponding to a user; determining identity information of a person corresponding to the recognized face, the identity information comprising at least one of an identification of the person corresponding to the face and a relationship between the person corresponding to the recognized face and the user; acquiring digital image information of the digital image, the digital image information comprising at least one of a digital image capturing time and a digital image capturing location of the digital image; and generating a description of the digital image according to the identity information and the digital image information.

Optionally, determining the identity information corresponding to the recognized face comprises: acquiring a personal information database, the personal information database comprising correspondence relationships between facial recognition information and personal identities; comparing the recognized face with the facial recognition information in the personal information database to identify a facial recognition information in the personal information database which matches the recognized face; and acquiring identity information corresponding to the facial recognition information in the personal information database which matches the recognized face.

Optionally, determining the identity information corresponding to the recognized face comprises: acquiring contact information of the user, the contact information comprising head portraits and personal identities of contacts; comparing the recognized face with the head portraits of the contacts to find a head portrait of a contact which matches the recognized face to find a head portrait of a contact which matches the recognized face; and acquiring identity information corresponding to the head portrait of the contact which matches the recognized face.

Optionally, generating the description of the digital image according to the identity information and the digital image information comprises: recognizing an object in the digital image to obtain a name of the object; and generating the description of the digital image according to the identity information, the digital image information and the name of the object.

Optionally, the method further comprises: grouping digital images into a collection of digital images; and generating a description of each collection of digital images according to a description of each digital image in the collection of digital images.

Optionally, grouping the digital images of the user comprises: grouping the digital images according to at least one of the following factors: digital image capturing times of the digital images, digital image capturing locations of the digital images and faces in the digital images.

Optionally, the method further comprises: displaying the grouping and the description of each group of digital images upon reception of a browsing command issued by the user.

Optionally, displaying the grouping and the description of each group of digital images comprises: displaying the digital images in each group and the descriptions of the digital images in a slideshow manner.

Other embodiments of the disclosure will be apparent to those skilled in the art from consideration of the specification and practice of the embodiments disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for generating a description based on content identified from a digital image by a mobile communication device, comprising:
   identifying a face depicted in a digital image corresponding to a user;
   determining identity information of a person corresponding to the identified face, the identity information comprising at least one of a name of the person and a relationship between the person and the user;
   acquiring digital image information of the digital image, the digital image information comprising at least one of a digital image capturing time and a digital image capturing location; and
   identifying an object in the digital image;
   acquiring a name of the object identified in the digital image; and
   generating a description of the digital image according to the identity information, the digital image information, and at least one of the name of the object, a weather information acquired for a day the digital image was captured, or a news event acquired for the digital image capturing time and the digital image capturing location.

2. The method of claim 1, wherein determining the identity information corresponding to the identified face comprises:
   acquiring a personal information database through a communication network shared with the mobile communication device, the personal information database including correspondence relationships between facial recognition information and personal identities;
   comparing the identified face with the facial recognition information in the personal information database to identify facial recognition information in the personal information database which matches the identified face; and acquiring the identity information corresponding to the facial recognition information in the personal information database which matches the identified face.

3. The method of claim 1, wherein determining the identity information corresponding to the identified face comprises:
  acquiring contact information corresponding to the user, the contact information including head portrait digital images and personal identities of contacts corresponding to the user;
  comparing the identified face with the head portrait digital images of the contacts to identify a head portrait digital image of a contact which includes a face that matches the recognized face; and
  acquiring a personal identity corresponding to the head portrait digital image of the contact which includes the face that matches the recognized face.

4. The method of claim 1, wherein generating the description of the digital image according to the identity information and the digital image information comprises:
  generating the description of the digital image according to the identity information, the digital image information, and the name of the object.

5. The method of claim 1, further comprising:
  grouping digital images of the user; and
  generating a description of each group of digital images according to a description of each digital image in the group of digital images.

6. The method of claim 2, further comprising:
  grouping digital images of the user; and
  generating a description of each group of digital images according to a description of each digital image in the group of digital images.

7. The method of claim 3, further comprising:
  grouping digital images of the user; and
  generating a description of each group of digital images according to a description of each digital image in the group of digital images.

8. The method of claim 4, further comprising:
  grouping digital images of the user; and
  generating a description of each group of digital images according to a description of each digital image in the group of digital images.

9. The method of claim 5, wherein grouping the digital images of the user comprises:
  grouping the digital images according to at least one of the following factors: digital image capturing times of the digital images, digital image capturing locations of the digital images and faces in the digital images.

10. The method of claim 9, further comprising:
  displaying the group of digital images and the description of each group of digital images upon reception of a browsing command input by the user.

11. The method of claim 10, wherein displaying the grouping and the description of each group of digital images comprises:
  displaying the digital images in each group of digital images and the descriptions of the digital images in a slideshow manner.

12. A digital image processing apparatus, comprising:
  a processor; and
  a memory configured to store instructions executable by the processor,
  wherein the processor is configured to execute the instructions to:
    identify a face depicted in a digital image corresponding to a user;
    determine identity information of a person corresponding to the identified face, the identity information comprising at least one of a name of the person and a relationship between the person and the user;
    acquire digital image information of the digital image, the digital image information comprising at least one of a digital image capturing time and a digital image capturing location;
    identify an object in the digital image;
    acquire a name of the object identified in the digital image;
    generate a description of the digital image according to the identity information, the digital image information, and at least one of the name of the object, a weather information acquired for a day the digital image was captured, or a news event acquired for the digital image capturing time and the digital image capturing location.

13. The apparatus of claim 12, wherein the processor is further configured to execute the instructions to:
  acquire a personal information database through a communication network shared with the apparatus, the personal information database including correspondence relationships between facial recognition information and personal identities;
  compare the identified face with the facial recognition information in the personal information database to identify facial recognition information in the personal information database which matches the identified face; and
  acquire the identity information corresponding to the facial recognition information in the personal information database which matches the identified face.

14. The apparatus of claim 12, wherein the processor is further configured to execute the instructions to:
  acquire contact information corresponding to the user, the contact information including head portrait digital images and personal identities of contacts corresponding to the user;
  compare the identified face with the head portrait digital images of the contacts to identify a head portrait digital image of a contact which includes a face that matches the recognized face; and
  acquire a personal identity corresponding to the head portrait digital image of the contact which includes the face that matches the recognized face.

15. The apparatus of claim 12, wherein the processor is further configured to execute the instructions to:
  generate the description of the digital image according to the identity information, the digital image information, and the name of the object.

16. The apparatus of claim 12, wherein the processor is further configured to execute the instructions to:
  group digital images of the user; and
  generate a description of each group of digital images according to a description of each digital image in the group of digital images.

17. The apparatus of claim 16, wherein the processor is further configured to execute the instructions to: group the digital images according to at least one of the following factors: digital image capturing times of the digital images, digital image capturing locations of the digital images and faces in the digital images.

18. The apparatus of claim 17, wherein the processor is further configured to execute the instructions to: display the group of digital images and the description of each group of digital images upon reception of a browsing command input by the user.

19. The apparatus of claim 18, wherein the processor is further configured to: display the digital images in each group of digital images and the descriptions of the digital images in a slideshow manner.

20. A non-transitory computer-readable storage medium having stored therein instructions that, when executed by a processor of a mobile device, cause a mobile communication device to:
- identify a face depicted in a digital image corresponding to a user;
- determine identity information of a person corresponding to the identified face, the identity information comprising at least one of a name of the person and a relationship between the person and the user;
- acquire digital image information of the digital image, the digital image information comprising at least one of a digital image capturing time and a digital image capturing location;
- identify an object in the digital image;
- acquire a name of the object identified in the digital image;
- generate a description of the digital image according to the identity information, the digital image information, and at least one of the name of the object, a weather information acquired for a day the digital image was captured, or a news event acquired for the digital image capturing time and the digital image capturing location.

* * * * *